US012743330B2

(12) United States Patent
Zhang et al.

(10) Patent No.: US 12,743,330 B2
(45) Date of Patent: Sep. 22, 2026

(54) KERNEL DUMP DISTRIBUTION ACROSS ELECTRONIC DEVICES

(71) Applicant: HEWLETT PACKARD ENTERPRISE DEVELOPMENT LP, Spring, TX (US)

(72) Inventors: Yongquan Zhang, Beijing (CN); Jinzhao Ren, Beijing (CN); Chunfeng Wang, Beijing (CN); Zhijun Ren, Beijing (CN); Ke Xu, Beijing (CN)

(73) Assignee: Hewlett Packard Enterprise Development LP, Spring, TX (US)

(*) Notice: Subject to any disclaimer, the term of this patent is extended or adjusted under 35 U.S.C. 154(b) by 29 days.

(21) Appl. No.: 18/739,434

(22) Filed: Jun. 11, 2024

(65) Prior Publication Data

US 2025/0377964 A1 Dec. 11, 2025

(51) Int. Cl.
*G06F 11/00* (2006.01)
*G06F 11/07* (2006.01)

(52) U.S. Cl.
CPC ...... *G06F 11/0778* (2013.01); *G06F 11/0784* (2013.01); *G06F 11/0787* (2013.01)

(58) Field of Classification Search
None
See application file for complete search history.

(56) References Cited

U.S. PATENT DOCUMENTS 6,643,802 B1 * 11/2003 Frost .................. G06F 11/0724 714/37
12,210,776 B1 * 1/2025 Ganigarakoppal Kantharaju ....... G06F 3/0689
2017/0192831 A1 * 7/2017 Abrams .............. G06F 11/0778
2017/0270008 A1 * 9/2017 Narasingarayanapeta ................. G06F 11/1458

OTHER PUBLICATIONS

Google Scholar/Patents search—text refined (Year: 2025).*
Google Scholar/Patents search—text refined (Year: 2026).*
Airheads Community, Controller Based WLANs downloaded May 27, 2024 (4 pages).
Red Hat Customer Portal, Red Hat Training, Chapter 7. Kernel crash dump guide downloaded May 27, 2024 (50 pages).
Ubuntu, Kernel crash dump downloaded May 27, 2024 (5 pages).

(Continued)

*Primary Examiner* — Christopher S McCarthy
(74) *Attorney, Agent, or Firm* — Trop, Pruner & Hu, P.C.

(57) ABSTRACT

In some examples, a management system receives information of a plurality of electronic devices, where the information of an electronic device includes network connectivity information relating to network connectivity of the electronic device and storage space information relating to a storage space of the electronic device. The management system selects, based on the received information of the plurality of electronic devices, a collection of electronic devices from among the plurality of electronic devices. The management system sends, to a first electronic device, identification information that identifies the selected collection of electronic devices to which the first electronic device is to distribute segments of an operating system (OS) kernel dump, and an available dump storage space of each respective electronic device of the selected collection of electronic devices to receive a respective segment of the OS kernel dump distributed from the first electronic device.

20 Claims, 4 Drawing Sheets

(56) References Cited

OTHER PUBLICATIONS

Wikipedia, kdump (Linux) downloaded June 3, 3024 (3 pages).
Wikipedia, "Clustered file system," Apr. 30, 2024, <https://en.wikipedia.org/w/index.php?title=Clustered_file_system&oldid=1221461979>, pp. 1-6.
Wikipedia, "Distributed data store," Apr. 5, 2024, <https://en.wikipedia.org/w/index.php?title=Distributed_data_store&oldid=1217385012>, pp. 1-4.

* cited by examiner

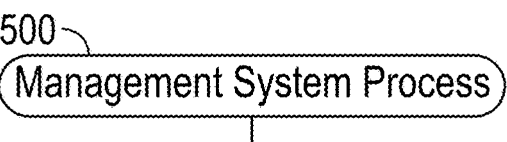

502

Receive information of a plurality of network devices, wherein the information of a network device of the plurality of network devices includes network connectivity information relating to network connectivity of the network device and storage space information relating to a storage space of the network device

504

Receive an indication from a first network device that the first network has experienced an issue, the indication including a size of a kernel dump created at the first network device in response to the issue

506

Select, based on the received information of the plurality of network devices, a collection of network devices from among the plurality of network devices, where the selecting includes excluding a second network device from the collection of the network device based on network connectivity information of the second network device failing to satisfy a network connectivity criterion, and excluding a third network device from the collection of the network devices based on storage space information of the third network device failing to satisfy a storage space criterion

508

Send, to the first network device, identification information that identifies the selected collection of network devices to which the first network device is to distribute segments of the kernel dump, and an available dump storage space of each respective network device of the selected collection of network devices, to receive a respective segment the kernel dump distributed from the first network device

FIG. 5

KERNEL DUMP DISTRIBUTION ACROSS ELECTRONIC DEVICES

BACKGROUND

An electronic device can include an operating system (OS) that manages resources of the electronic device. The resources include hardware resources, program resources, and other resources. The OS includes a kernel, which is the core of the OS and performs various tasks, including controlling hardware resources, arbitrating conflicts between processes relating to the resources, managing file systems, performing various services for parts of the electronic device, including other parts of the OS, and so forth.

BRIEF DESCRIPTION OF THE DRAWINGS

Some implementations of the present disclosure are described with respect to the following figures.

FIG. 5 is a flow diagram of a management system process according to some examples.

Figure 1:
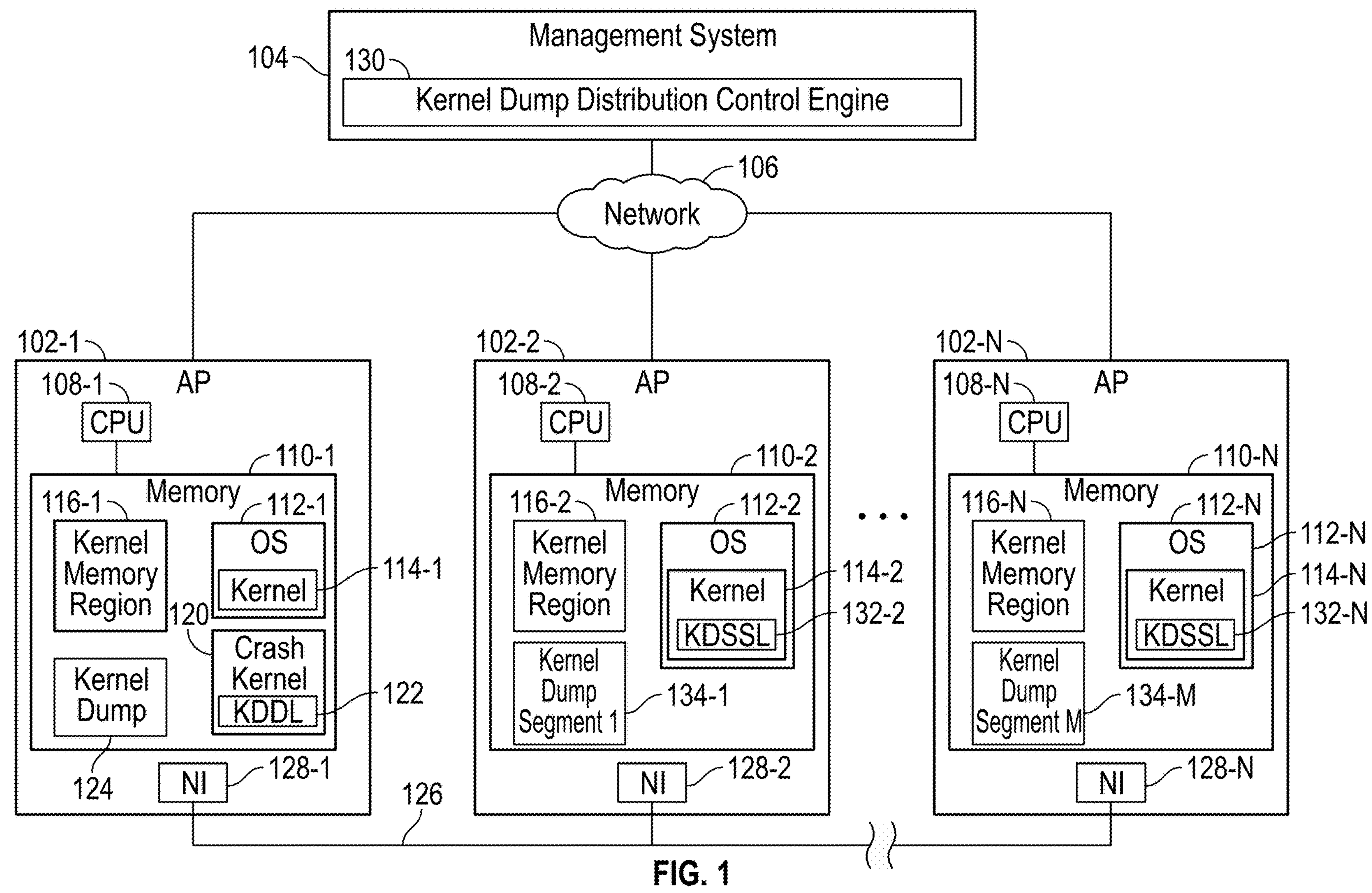
FIG. 1 is a block diagram of an arrangement including multiple access points (APs) and a management system and, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Certain electronic devices have relatively small storage capacity to store data. The storage capacity may be provided by one or more memory devices and/or storage devices. Examples of electronic devices with relatively small storage capacity include network devices such as access points (APs) or network switches. A network device is part of a network and allows client devices to establish connections with the network device to access the network for communications. In other examples, other types of electronic devices, such as embedded devices, may have restricted storage capacity.

When an issue arises in an electronic device, information related to an operation of the electronic device may be captured as dump information. Examples of issues in the electronic device can include any or some combination of the following: a program (e.g., an operating system (OS), firmware, or other machine-readable instructions) of the electronic device crashes, a data error occurs, a hardware fault or fault of machine-readable instructions occurs, or any other condition indicating that the electronic device is operating in an unexpected manner.

The information captured includes information associated with an OS kernel of the electronic device. The captured information associated with the OS kernel can be referred to as a "kernel dump." The kernel dump may be relatively large in size (e.g., several hundred megabytes (MBs) or gigabytes (GBs) in size), and thus may not fit in the storage space of the electronic device. In such cases, the kernel dump of the electronic device is saved to an external device, such as an external server system.

Storing a large kernel dump in an external device may have various issues. A network link between the electronic device and the external device may be slow. Also, the network link may be down, in which case it would not be possible to transfer the kernel dump from the electronic device to the external device. In other cases, the external device may be unavailable; for example, the external device may experience a fault that renders the external device unreachable, or the external device may be down for maintenance or repairs. If the transfer of the kernel dump to the external device is unsuccessful, the kernel dump may be lost, which would prevent an analysis of the kernel dump to identify any issues that caused the electronic device to create the kernel dump.

Additionally, using an external device to receive kernel dumps of electronic devices can be expensive. An enterprise has to invest in purchasing the equipment and programs for implementing the external device. Also, the enterprise has to maintain the external device.

Further, after the electronic device creates a kernel dump due to a crash of an OS kernel of the electronic device, the electronic device may not be available for use until after a crash kernel (which is a reduced functionality kernel) transfers the kernel dump to the external device. Thus, it is desirable to transfer the kernel dump to the external device as quickly as possible using the crash kernel, so that the electronic device can reboot the OS kernel to allow the electronic device to continue providing services. If the network link to the external device is slow or unreliable, then the slow transfer of the kernel dump to the external device would lead to a longer downtime of the electronic device. It may be possible to connect the electronic device to the external device over a fast local network to increase the transfer speed of the kernel dump. However, if the enterprise deploys a large quantity of electronic devices at multiple physical sites, then multiple external devices would have to be provided at the respective physical sites to connect over local networks to the electronic devices. Maintaining a large quantity of external devices to receive kernel dumps may be expensive for the enterprise.

In accordance with some implementations of the present disclosure, a management system is able to identify neighbor electronic devices that can potentially receive an OS kernel dump from a given electronic device in case of a crash of the given electronic device. The management system can notify the given electronic device of a collection of electronic devices to use for OS kernel dump, where the collection of electronic devices is selected from the neighbor electronic devices based on network connectivity information and storage space information of the neighbor electronic devices. The management system can also send available storage space information specifying available storage spaces of the collection of electronic devices. The given electronic device can partition the OS kernel dump into multiple OS kernel dump segments based on the available storage spaces of the collection of electronic devices, and the given electronic device is able to distribute the multiple OS kernel dump segments collection to the collection of electronic devices in response to a crash of (or any other issue experienced by) the given electronic device.

As used here, a "management system" can refer to any system including one or more computers for performing management or administrative tasks with respect to electronic devices. In some examples, the management system may be part of a cloud computing environment. In other examples, the management system may be in a web server, in a data center, or at any other site.

FIG. 1 is a block diagram of an example arrangement that includes multiple access points (APs) 102-1, 102-2, . . . , 102-N (N>2) and a management system 104. The management system 104 is coupled over a network 106 to the APs 102-1 to 102-N. In some examples, the network 106 may include a public network (such as the Internet), a wide area network (WAN), or another type of network.

In the example of FIG. 1, the APs are examples of electronic devices from and to which kernel dumps may be distributed according to some examples of the present disclosure. In other examples, distribution of kernel dumps can occur among other types of electronic devices, such as network switches, or other types of devices such as Internet of Things (IoT) devices, or any other devices with restricted storage capacity.

Each AP includes a central processing unit (CPU) and a memory. A CPU can include one or more hardware processors. A hardware processor can include a microprocessor, a core of a multi-core microprocessor, a microcontroller, a programmable integrated circuit, a programmable gate array, or another hardware processing circuit. In some examples, the memory can be a nonvolatile memory, which can be implemented using one or more flash memory devices or other types of nonvolatile memory devices. The AP 102-1 includes a CPU 108-1 and a memory 110-1, the AP 102-2 includes a CPU 108-2 and a memory 110-2, and the AP 102-N includes a CPU 108-N and a memory 110-N.

A memory of an AP can store machine-readable instructions and data. In the example of FIG. 1, a memory can store machine-readable instructions of an OS, which includes a kernel. For example, the memory 110-1 of the AP 102-1 stores an OS 112-1, which includes a kernel 114-1; the memory 110-2 of the AP 102-2 stores an OS 112-2, which includes a kernel 114-2; and the memory 110-N of the AP 102-N includes an OS 112-N, which includes a kernel 114-N.

As a kernel in an AP executes, kernel information may be created for the running kernel and stored in the memory of the AP. In the example of FIG. 1, runtime kernel information of the kernel 114-1 is stored in a kernel memory region 116-1 of the memory 110-1, runtime kernel information of the kernel 114-2 is stored in a kernel memory region 116-2 of the memory 110-2, and runtime kernel information of the kernel 114-N is stored in a kernel memory region 116-N of the memory 110-N. The runtime kernel information in a kernel memory region contains information in use by a kernel during execution of the kernel.

In case of a crash of an AP, such as a crash of the kernel running in the AP or any other event in the AP that causes the AP to no longer function in an expected manner, a crash kernel can take over in the AP in place of the previously running kernel. A crash kernel can also be referred to as a "dump kernel" or a "panic kernel." The crash kernel is a reduced functionality kernel that performs basic functions in an AP that has experienced a kernel crash.

In the example of FIG. 1, if the kernel 114-1 in the AP 102-1 crashes, a crash kernel 120 stored in the memory 110-1 can be launched and executed on the CPU 108-1. The kernel 114-1 that crashed is no longer executing in the AP 102-1. The machine-readable instructions of the crash kernel 120 can be stored in a memory region of the memory 110-1. The memory region storing the crash kernel 120 can be separate from the kernel memory region 116-1 containing the information of the running kernel 114-1.

When launched, the crash kernel 120 can create a kernel dump object 124 based on the runtime kernel information in the kernel memory region 116-1. The kernel dump object 124 may be in the form of a file or in any other format. For example, if the kernel 114-1 is a Linux kernel, then the kernel dump object 124 may be a file according to the Executable and Linkable Format (ELF). For other types of kernels, the kernel dump object 124 may be according to other formats.

The kernel dump object 124 can contain the runtime kernel information (copied from the kernel memory region 116-1) as well as other information. An example of the other information includes the content of registers (a program counter, a stack pointer, etc.) of the CPU 108-1 used by the kernel 114-1. The registers of the CPU 108-1 can store state information of the kernel 114-1. Additionally, the other information included in the kernel dump object 124 may include metadata useful for interpreting the kernel dump object 124. The metadata may include a version of the kernel 114-1, information regarding variables in the kernel dump object 124, the architecture of the CPU 108-1, and/or other metadata.

Although not shown in FIG. 1, crash kernels can also be stored in respective memories 110-2 and 110-N of the APs 102-2 and 102-N. These crash kernels in the APs 102-2 and 102-N can also create similar kernel dump objects.

The crash kernel 120 includes a kernel dump distribution logic (KDDL) 122 that manages the distribution of the kernel dump object in segments (referred to as "kernel dump segments") across multiple other APs, such as two or more of the APs 102-2 to 102-N. The KDDL 122 is implemented with machine-readable instructions that are part of the crash kernel 120.

As shown in FIG. 1, the APs 102-1 to 102-N are connected by a local network 126, such as a local area network (LAN), or any other type of interconnect that may be more reliable and/or have a higher transfer rate than the network 106. Kernel dump segments may be transferred over the local network 126.

Each AP includes a network interface to communicate over the local network 126. The AP 102-1 includes a network interface 128-1, the AP 102-2 includes a network interface 128-2, and the AP 102-N includes a network interface 128-N. A network interface can include a transceiver to transmit and receive signals over the local network 126. The network interface may also include one or more protocol layers that manage communications of information according to respective one or more communication protocols.

Each AP also includes a network interface (not shown) to communicate over the network 106. The network interface to communicate over the network 106 is different from the network interfaces 128-1 to 128-N to communicate over the local network 126. In other examples, instead of communicating kernel dump segments over the local network 126, the APs can distribute kernel dump segments over the network 106.

In the ensuing discussion, it is assumed that the AP 102-1 has experienced a crash that has triggered invocation of the crash kernel 120. Based on information provided by a kernel dump distribution control engine 130 in the management system 104, the KDDL 122 of the crash kernel 120 partitions the kernel dump object 124 into respective kernel dump segments. The KDDL 122 sends the kernel dump segments through the network interface 128-1 and over the local network 126 to a collection of APs specified by the kernel dump distribution control engine 130. In an example, it is assumed that the collection of APs specified by the kernel dump distribution control engine 130 includes M (M≥2) APs, including the AP 102-2 and the AP 102-N (and possibly other APs).

Upon receipt of respective kernel dump segments from the KDDL 122, a kernel dump segment storage logic (KDSSL) 132-2 of the kernel 114-2 in the AP 102-2 stores a kernel dump segment 134-1 in the memory 110-2, and a KDSSL 132-N of the kernel 114-N in the AP 102-N stores a kernel dump segment 134-M in the memory 110-N. The kernel dump segments 134-1 to 134-M are partitioned from the kernel dump object 124. Each KDSSL 132-2 or 132-N is implemented with machine-readable instructions that are part of the respective kernel 114-2 or 114-N. Although not shown in FIG. 1, the kernel 114-1 in the AP 102-1 also includes a KDSSL to store a kernel dump segment received from another AP that has experienced a crash.

The kernel dump distribution control engine 130 in the management system 104 is able to collect information from the various APs 102-1 to 102-N. Based on the collected information, the kernel dump distribution control engine 130 selects a collection of APs for use by a respective AP to distribute a kernel dump object when the respective AP crashes. For example, for the AP 102-1, the kernel dump distribution control engine 130 selects a first collection of APs to be used by the AP 102-1 in distributing segments of the kernel dump object 124. For the AP 102-2, the kernel dump distribution control engine 130 selects a second collection of APs to be used by the AP 102-2 in distributing segments of a kernel dump object created in the AP 102-2 if the AP 102-2 crashes. Similarly, for the AP 102-N, the kernel dump distribution control engine 130 selects a third collection of APs to be used by the AP 102-N in distributing segments of a kernel dump object created in the AP 102-N if the AP 102-N crashes.

The first, second, and third collections of APs are different from one another. A "collection" of APs can include a selected subset of APs selected from among neighbor APs of a given AP. The selected subset can be less than all of the neighbor APs, or alternatively, the selected subset can be all of the neighbor APs. A "neighbor" AP of the given AP is an AP to which the given AP can quickly and reliably distribute a kernel dump segment. For example, the neighbor AP is connected to the same local network as the given AP.

After selection of the collection of APs for use by the respective AP, the kernel dump distribution control engine 130 sends, to the respective AP, identification information that identifies the collection of APs. The KDDL in the respective AP uses the identification information to determine the collection of APs for receiving segments of a kernel dump object.

Figure 2:
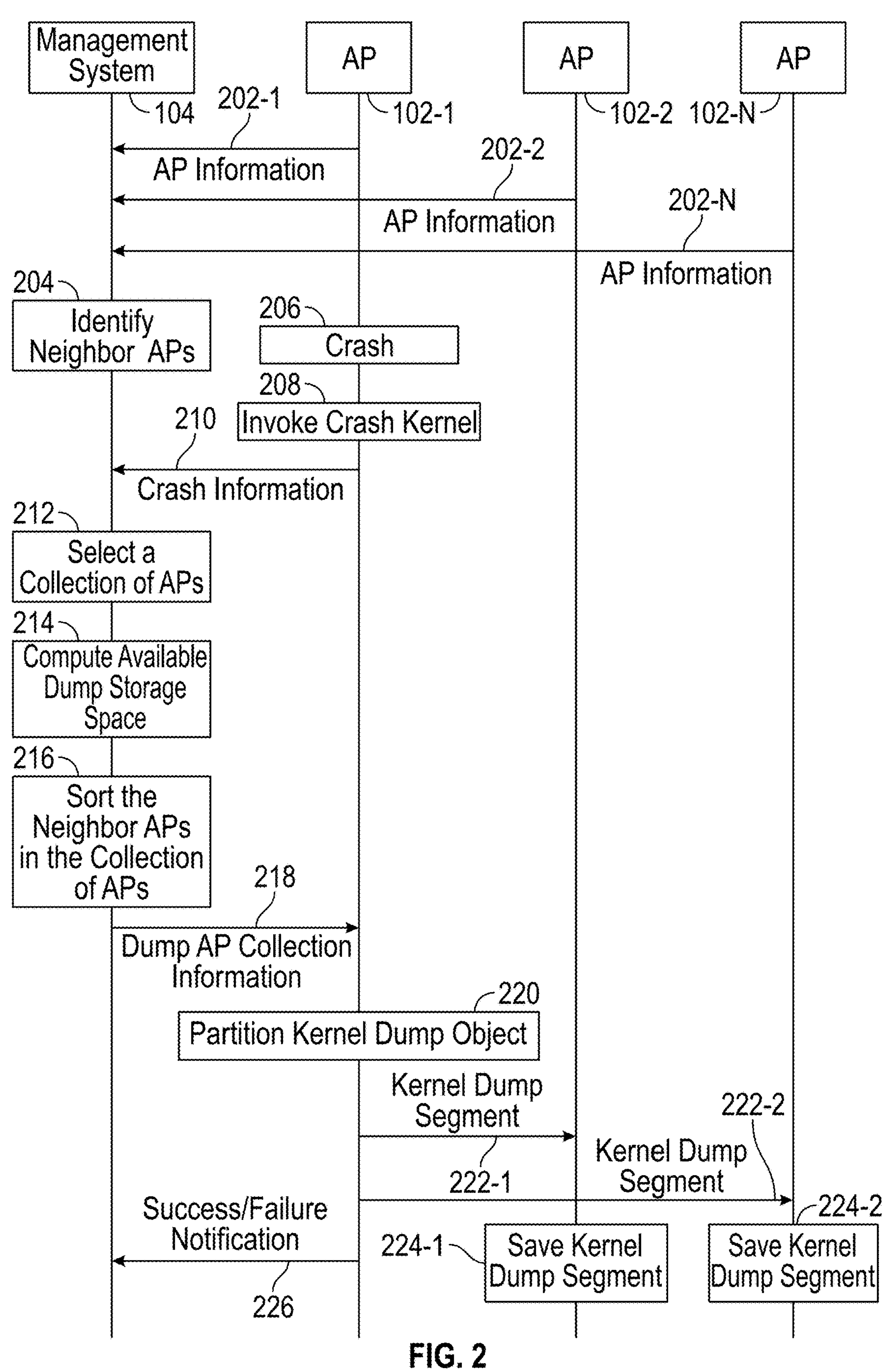
FIG. 2 is a flow diagram of a kernel dump distribution process, according to some examples.

FIG. 2 is a flow diagram of a kernel dump distribution process according to some examples of the present disclosure. The example of FIG. 2 assumes that the AP 102-1 has experienced a crash. Although FIG. 2 depicts a specific order of tasks, in other examples, the tasks can be performed in a different order, some of the tasks may be omitted, and other tasks may be added.

The management system 104 receives AP information from each of the APs 102-1 to 102-N. Specifically, the management system 104 receives (at 202-1) AP information from the AP 102-1, the management system 104 receives (at 202-2) AP information from the AP 102-2, and the management system 104 receives (at 202-N) AP information from the AP 102-N. The AP information received from a given AP includes any or some combination of the following: network connectivity information, storage space information, crash information, memory programming information, or other information.

The network connectivity information of the given AP can include information relating to a network over which the given AP is able to communicate. For example, the network connectivity information can identify the local network 126 as a network over which the given AP is able to communicate. The identification of the local network 126 may be based on an identified subnet specified by a portion of Internet Protocol (IP) address assigned to the given AP, for example. The network connectivity information can also include network status information indicating whether the given AP is able to communicate over the identified network. The network status information (e.g., a flag or another indicator) can be set to a first value (network available indication) to indicate that the AP is able to communicate over the identified network. The network status information (e.g., a flag or another indicator) can be set to a different second value (network unavailable indication) to indicate that the given AP is unable to communicate over the identified network.

The storage space information indicates the amount of free storage space that is available in the given AP. For example, the storage space information can represent the free storage capacity of the memory (e.g., 110-1, 110-2, or 110-N) in the given AP. The "free storage capacity" of the memory refers to the maximum available amount of storage space in the memory that is available to store kernel-related information.

The crash information indicates when a last crash was experienced by the given AP. For example, the crash information includes a timestamp representing the time at which the last crash of the given AP occurred.

The memory programming information includes a memory programming count specifying how many times the memory of the given AP has been programmed. Programming a memory can refer to writing data to the memory or erasing the memory. The memory in the given AP (or more specifically, a memory controller for the memory) can track a count of a number of erases and/or a number of writes of the memory. For example, the memory controller can include a first counter that counts a number of erases of the memory, and a second counter that counts a number of writes to the memory. The memory programming count received in the AP information from the given AP can indicate a sum (or another mathematical aggregate such as an average) of the count of the first counter and the count of the second counter, for example. Repeated programming of a memory, such as a flash memory, can degrade (age) the memory over the programming cycles. Thus, the kernel dump distribution control engine 130 favors APs with lower memory programming counts.

Based on the AP information from various APs, the kernel dump distribution control engine 130 identifies (at 204) neighbor APs, such as APs connected to the same local network, or more generally, APs that can communicate with one another with a latency less than a latency threshold or at a data rate greater than a data rate threshold.

At a later time, the AP 102-1 experiences a crash (at 206). In response to the crash, the crash kernel 120 is invoked (at 208). The crash kernel 120 is invoked automatically by the AP 102-1 based on a detection that the kernel 114-1 is no longer functioning.

The crash kernel 120 sends (at 210) crash information to the management system 104. The crash information can include an indicator that the crash has occurred in the AP 102-1, and further, the crash information can include a size of the kernel dump object 124 created by the crash kernel 120.

The kernel dump distribution control engine 130 selects (at 212) a collection of the APs (from neighbor APs of the AP 102-1) for distribution of respective segments of the kernel dump object 124. The collection of APs is selected by the kernel dump distribution control engine 130 based on the AP information received from the neighbor APs (in this case AP 102-2 to 102-N).

The selection of the collection of APs is based on any or some combination of the factors discussed below. The factors include a network connectivity factor, a storage space factor, a recency of crash factor, and a memory age factor.

A neighbor AP is selected based on the network connectivity factor for inclusion in the collection of APs if the network connectivity information indicates that the neighbor AP is network reachable (i.e., the network status information from the neighbor AP has the network available indication). Stated differently, any neighbor AP that is not network reachable (i.e., the network status information from the neighbor AP has the network unavailable indication) is excluded by the kernel dump distribution control engine 130 from the collection of APs.

A neighbor AP is selected based on the storage space factor for inclusion in the collection of APs if the storage space information indicates that the neighbor AP has a free storage space that exceeds a working storage space size by a sufficient amount to receive a kernel dump segment. The working storage space size represents the amount of memory used in the neighbor AP for normal operations of the neighbor AP. "Normal operations" of an AP can include operations of the AP relating to establishing wireless connections with client devices and transferring data between the client devices and other devices. In an example, the operating memory size can be 500 megabytes (MBs), or any other memory size. If the neighbor AP's free storage space as indicated in the storage space information of the neighbor AP is not greater than the operating memory size plus a minimum size threshold, the neighbor AP is excluded from the collection of APs by the kernel dump distribution control engine 130.

The minimum size threshold is based on dividing the size of the kernel dump object 124 by an AP_COUNT value, which represents a target quantity of neighbor APs to be included in the collection of APs. For example, if the AP_COUNT has a value of 12, then the kernel dump object 124 is to be partitioned into 12 kernel dump segments to be distributed to the 12 neighbor APs in the collection of APs. The size of the kernel dump object 124 divided by 12 is the minimum threshold size. Any neighbor AP without a free storage space that is greater than the operating memory size plus the minimum size threshold would not be included in the collection of APs.

The value of AP_COUNT is set within a target range of values to provide a sufficient quantity of APs with sufficient free storage space to accommodate respective kernel dump segments, while not selecting such a large quantity of APs that distributing the kernel dump segments to the APs may be burdensome on the AP that is distributing the kernel dump object.

A neighbor AP is selected based on the recency of crash factor for inclusion in the collection of APs if the neighbor AP has not crashed recently as indicated by the crash information of the neighbor AP, i.e., the neighbor AP has not crashed within a specified time interval of a current time. A neighbor AP that has crashed within the specified time interval of the current time is excluded by the kernel dump distribution control engine 130 from the collection of APs.

A neighbor AP is selected based on the memory age factor for inclusion in the collection of APs if the neighbor AP with a relatively low memory programming count, as indicated by the memory programming information. The kernel dump distribution control engine 130 can compare the memory programming counts of the neighbor APs, and can identify which neighbor APs have lower memory programming counts than other neighbor APs. The neighbor APs with lower memory programming counts are prioritized for selection over neighbor APs with higher memory programming counts. For example, if there are 20 neighbor APs available, and the kernel dump distribution control engine 130 is to select 12 neighbor APs to include in the collection of APs, then the kernel dump distribution control engine 130 will select the 12 neighbor APs with the lowest memory programming counts, provided other factors would not cause exclusion of the 12 neighbor APs.

In some examples, the quantity of neighbor APs in the collection of APs is equal to AP_COUNT, which is the target quantity of APs across which a kernel dump object is to be distributed. In other examples, the quantity of neighbor APs in the collection of APs is greater than AP_COUNT. The additional neighbor APs (that are lower in a sorted order according to sorting criterion discussed further below) can be used in case neighbor APs that are higher in the sorted order are unable to receive kernel dump segments for some reason (e.g., due to a communication failure or failure of a neighbor AP). Generally, the collection of APs includes R neighbor APs, where $R \geq 2$, and R can be equal to or greater than AP_COUNT. For example, R can be derived by multiplying AP_COUNT by a factor greater than 1 (e.g., the factor can be 1.5 or another value).

After selecting the collection of APs, the kernel dump distribution control engine 130 computes (at 214) an available dump storage space (Dump_Storage_Space(i), i=1 to R) available in each neighbor AP i of the collection of APs, according to the following formula:

$$\text{Dump\_Storage\_Space}(i) = \text{Free\_Storage\_Space}(i) - \text{Minimum\_Size}.$$

In the formula above, Free_Storage_Space(i) represents the free storage space available in AP i, and Minimum_Size represents the minimum size threshold.

The kernel dump distribution control engine 130 sorts (at 216) the neighbor APs in the collection of APs by a sorting criterion. For example, the sorting criterion can sort neighbor APs by memory programming counts. The sorting produces a sorted list of neighbor APs (that are part of the collection of APs), where a neighbor AP with a lower memory programming count is higher in the sorted order than a neighbor AP with a higher memory programming count. In further examples, the sorting criterion can include alternative or additional factors, such as sorting based on Dump_Storage_Space(i), sorting based on recency of any prior crash, and so forth.

The kernel dump distribution control engine 130 sends (at 218), to the AP 102-1 that has crashed, dump AP collection information for identifying the collection of APs to which dump kernel segments can be distributed. The dump AP collection information includes a sorted list of identifiers of the neighbor APs in the collection of APs. The identifiers in the sorted list can include IP addresses or other types of identifiers of the neighbor APs in the collection of APs. Additionally, the dump AP collection information includes the available dump storage space for each neighbor AP in the collection of APs. For example, the dump AP collection information can have the following form:

| Neighbor AP Identifier | Available Dump Storage Space |
|---|---|
| AP_ID_1 | 40 MB |
| . . . | . . . |
| AP_ID_R | 65 MB |

The KDDL 122 in the AP 102-1 partitions (at 220) the kernel dump object 124 into multiple kernel dump segments. In some examples, the number of the kernel dump segments is equal to AP_COUNT, which may have been configured in the crash kernel 120. Alternatively, the value of AP_COUNT is sent from the kernel dump distribution control engine 130 to the AP 102-1. The partitioning of the kernel dump object (at 220) can be performed before or after receiving the dump AP collection information from the kernel dump distribution control engine 130.

In some examples, the KDDL 122 partitions the kernel dump object 124 into equal size kernel dump segments, i.e., Kernel_Dump_Object_Size/AP_COUNT, where Kernel_ Dump_Object_Size represents the size of the kernel dump object 124).

In other examples, the KDDL 122 may partition the kernel dump object 124 into variable size kernel dump segments, depending on the available dump storage space (Dump_ Storage_Space(i)) of each neighbor AP i. For example, the KDDL 122 may create a first kernel dump segment for neighbor AP 1 of size X, and create a second kernel dump segment for neighbor AP 2 of size Y, where X≠Y. Size X is computed by the KDDL 122 based on Dump_Storag-e_Space(1) for neighbor AP 1, and size Y is computed by the KDDL 122 based on Dump_Storage_Space(2) for neighbor AP 2. If X>Y, then the first kernel dump segment may be larger than the second kernel dump segment.

The KDDL 122 distributes (at 222-1, 222-2) the kernel dump segments to respective neighbor APs (102-2, 102-N) of the collection of APs. In response to receiving the corresponding kernel dump segments, the KDSSLs (132-2, 132-N) in the respective neighbor APs save (at 224-1, 224-2) the corresponding kernel dump segments to local memories (110-2, 110-N) of the neighbor APs.

Note that the transfer of a kernel dump segment to a given neighbor AP may fail. In this case, the KDDL 122 may retry the sending of the kernel dump segment to the given neighbor AP a specified number of times. If the retries all fail, then the KDDL 122 may select a different neighbor AP of the collection of APs to send the kernel dump segment, assuming that the collection of APs includes more than AP_COUNT neighbor APs.

The KDDL 122 may send (at 226) a notification to the kernel dump distribution control engine 130 of the success or failure of the distribution of the kernel dump segments to the neighbor APs of the collection of APs. A success is indicated in the notification if all kernel dump segments were transferred to respective neighbor APs. A failure is indicated in the notification if at least one of the kernel dump segments cannot be transferred to a neighbor AP in the collection of APs. The notification also includes kernel dump segment-neighbor AP mapping information that identifies which neighbor APs have which kernel dump segments. Kernel dump segments can be identified using location information (e.g., uniform resource locators (URLs), memory addresses, etc.) that allows the kernel dump segments to be retrieved from respective memories in the neighbor APs.

The kernel dump distribution control engine 130 can use the kernel dump segment-neighbor AP mapping information to retrieve the kernel dump segments from the respective neighbor APs. The kernel dump distribution control engine 130 can send the retrieved kernel dump segments to a target entity (e.g., a human, a program, or a machine) for analyzing the information of the kernel dump segments to determine a root cause of a crash in the AP 102-1.

In some cases, the kernel dump distribution control engine 130 may determine that neighbor APs available to receive a kernel dump object may collectively not have sufficient total memory to receive the kernel dump object. More specifically, the size of the kernel dump object may be greater than the sum of the available dump storage space of the available neighbor APs. In this case, the kernel dump distribution control engine 130 can inform the AP 102-1 that neighbor APs do not have sufficient storage capacity for the kernel dump object, so that the crash kernel 120 in the AP 102-1 would have to try a different way to send the kernel dump object, such as by sending the kernel dump object to an external server system if available.

By using techniques or mechanisms according to some examples of the present disclosure, a kernel dump object may be transferred by an AP that has crashed more quickly to neighbor APs as compared to transferring the kernel dump object to an external device. This allows quicker recovery at the crashed AP, which may include replacing the prior kernel with a different version of the kernel, such as a kernel of a known good state. In addition, transferring smaller size kernel dump segments may be more reliable than transferring a larger size kernel dump object as a single unit.

Also, in some examples, an external device to receive kernel dump objects would not have to be implemented, which can reduce hardware and software costs associated with the external device.

Figure 3:
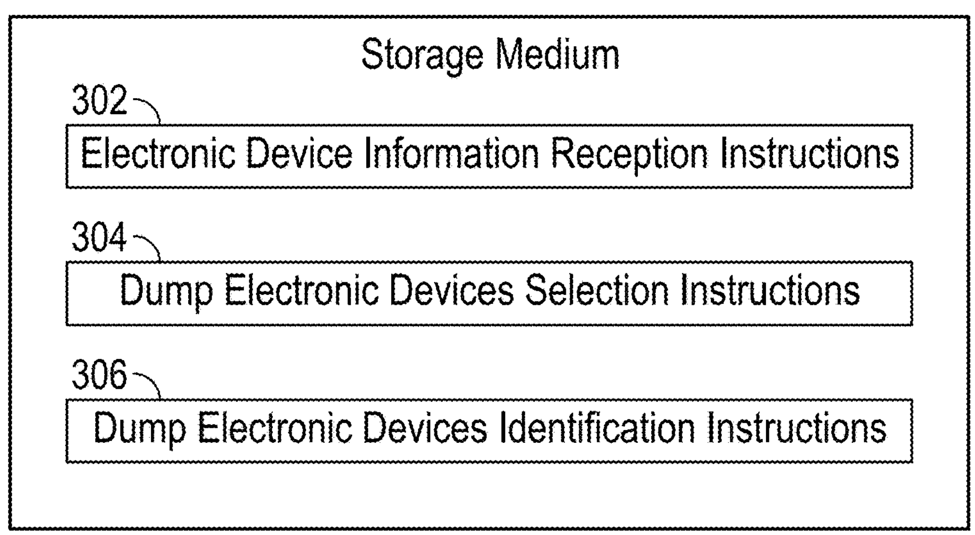
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a management system (e.g., 104 in FIG. 1) to perform various tasks.

The machine-readable instructions include electronic device information reception instructions 302 to receive, at the management system, information of a plurality of electronic devices, where the information of an electronic device of the plurality of electronic devices includes network connectivity information relating to network connectivity of the electronic device and storage space information relating to a storage space of the electronic device. The storage space information indicates the amount of free storage space that is available in the electronic device. The electronic devices may include network devices, such as APs or network switches, or any other types of electronic devices with restricted storage space capacity.

The machine-readable instructions include dump electronic devices selection instructions 304 to select, based on the received information of the plurality of electronic devices, a collection of electronic devices from among the plurality of electronic devices. The collection of electronic devices are candidate electronic devices for receiving segments of an OS kernel dump.

The machine-readable instructions include dump electronic devices identification instructions 306 to send, from the management system to a first electronic device of the plurality of electronic devices, identification information that identifies the selected collection of electronic devices to which the first electronic device is to distribute segments of an OS kernel dump, and an available dump storage space of each respective electronic device of the selected collection of electronic devices. The available dump storage space is for receiving a respective segment of the OS kernel dump distributed from the first electronic device. The OS kernel dump was created at the first electronic device due to an issue detected at the first electronic device, such as a crash at the first electronic device.

In some examples, the machine-readable instructions identify the plurality of electronic devices as neighbor electronic devices based on connections of the plurality of electronic devices to a local network (e.g., 126 in FIG. 1).

In some examples, the information of the electronic device of the plurality of electronic devices further includes an indication of a recency of a crash of the electronic device. The indication of the recency of the crash of the electronic device can be included in crash information, for example. The machine-readable instructions can select the collection of electronic devices from among the plurality of electronic devices further based on the indication of the recency of the crash of the electronic device.

In some examples, the information of the electronic device of the plurality of electronic devices further includes an indication of how many times programming (erases and/or writes) of a memory of the electronic device has occurred. For example, the indication includes a memory programming count specifying how many times the memory of the electronic device has been programmed. The machine-readable instructions can select the collection of electronic devices from among the plurality of electronic devices further based on the indication of how many times programming of the memory of the electronic device has occurred.

In some examples, the machine-readable instructions can exclude a given electronic device of the plurality of electronic devices from the collection of electronic devices based on a network connectivity of the given electronic device failing to satisfy a network connectivity criterion (e.g., the given electronic device is not reachable over the local network or the communication link to the electronic device is unreliable, e.g., the communication link has a data rate less than a data rate threshold, the communication link has an data error rate exceeding an error rate threshold, etc.).

In some examples, the machine-readable instructions can exclude a given electronic device of the plurality of electronic devices from the collection of electronic devices based on an available dump storage space of the given electronic device being less than a storage space threshold. The available dump storage space is represented by Dump_Storage_Space(i), for example.

In some examples, the machine-readable instructions can determine the size of the OS kernel dump. The determination of whether the available dump storage space of the given electronic device is less than the storage space threshold is based on the determined size of the OS kernel dump. For example, the storage space threshold is the minimum size threshold based on dividing the size of the kernel dump by a device quantity parameter (e.g., AP_COUNT) specifying how many electronic devices the OS kernel dump is to be partitioned across. The dividing of the size of the OS kernel dump by the device quantity parameter produces a per-electronic device OS kernel dump size, which is the minimum size threshold. The determining of whether the available dump storage space of the given electronic device is less than the storage space threshold is based on the per-electronic device OS kernel dump size.

In some examples, the machine-readable instructions can compute the available dump storage space of the given electronic device based on subtracting the per-electronic device OS kernel dump size from a working storage space size, which represents the amount of memory used in the given electronic device for normal operations of the given electronic device, such as operations performed by application programs and/or an OS of the given electronic device.

In some examples, the collection of electronic devices includes electronic devices of the plurality of electronic devices that satisfy one or more criteria (such as the network connectivity factor, storage space factor, recency of crash factor, and memory age factor discussed above). A quantity of the electronic devices in the collection of electronic devices is based on how many electronic devices the OS kernel dump is to be partitioned across.

In some examples, a device quantity parameter (e.g., AP_COUNT) represents how many electronic devices the OS kernel dump is to be partitioned across, and the quantity of the electronic devices in the collection of electronic devices is based on multiplying the device quantity parameter by a factor greater than 1.

In some examples, the machine-readable instructions can sort the electronic devices in the collection of electronic devices according to respective quantities of programming of memories of the electronic devices. The identification information sent from the management system to the first electronic device includes a list of identifiers of the electronic devices in the collection of electronic devices sorted according to the respective quantities of programming of memories of the electronic devices.

Figure 4:
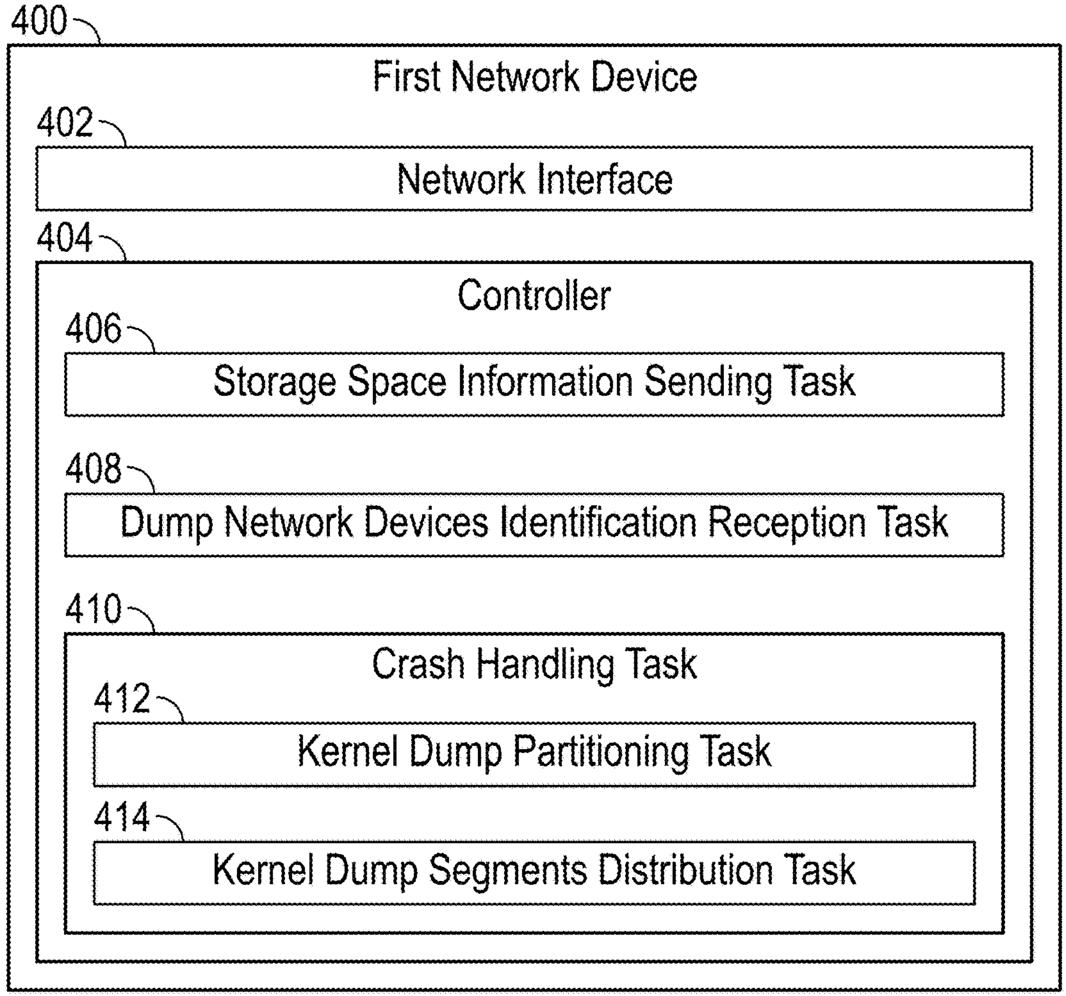
FIG. 4 is a block diagram of a network device according to some examples.

FIG. 4 is a block diagram of a first network device 400. For example, the first network device 400 may be one of the APs of FIG. 1. Alternatively, the first network device 400 may include a network switch or any other device that transfers data over a network.

The first network device 400 includes a network interface 402 to communicate over a network with other network devices. An example of the network interface 402 is the network interface 128-1, 128-2, or 128-N of FIG. 1.

The first network device 400 includes a controller 404 to perform various tasks. As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

The tasks of the controller 404 include a storage space information sending task 406 to send, from the first network device 400 to a management system, storage space information of a storage space of the first network device. The storage space information indicates the amount of free storage space that is available in the first network device 400.

The tasks of the controller 404 include a dump network devices identification reception task 408 to receive, at the first network device 400 from the management system, identification information of a collection of network devices selected from among a plurality of network devices by the management system based on network connectivity information of the plurality of network devices and storage space information of the plurality of network devices.

The tasks of the controller 404 include a crash handling task 410 performed by the controller 404 in response to a crash of the first network device 400 that resulted in an OS kernel dump being created at the first network device 400. The crash handling task 410 includes a kernel dump partitioning task 412 to partition the OS kernel dump across multiple network devices selected from the collection of network devices identified by the identification information received from the management system, the partitioning producing multiple OS kernel dump segments.

The crash handling task 410 includes a kernel dump segments distribution task 414 to distribute, over the network, the multiple OS kernel dump segments to respective network devices of the multiple network devices.

In some examples, the controller 404 receives available dump storage space information of each network device in the collection of network devices, the available dump storage space information specifying how much storage space is available in each network device to receive a segment of the OS kernel dump. The partitioning of the OS kernel dump into the multiple OS kernel dump segments is based on the available dump storage space information of each network device in the collection of network devices.

In some examples, the controller 404 detects a failure in sending a first OS kernel dump segment of the multiple OS kernel dump segments to a second network device in the collection of network devices. In response to detecting the failure, the controller 404 selects another network device of the collection of network devices to which the first OS kernel dump segment is sent.

In some examples, the OS kernel dump is to be distributed across a specified quantity of network devices, and the collection of network devices includes more network devices than the specified quantity of network devices.

FIG. 5 is a flow diagram of a process 500 according to some examples. The process 500 may be performed by a management system (e.g., 104), for example.

The process 500 includes receiving (at 502), at the management system, information of a plurality of network devices, wherein the information of a network device of the plurality of network devices includes network connectivity information relating to network connectivity of the network device and storage space information relating to a storage space of the network device.

The process 500 includes receiving (at 504), at the management system, an indication from a first network device that the first network device has experienced an issue, the indication including a size of a kernel dump created at the first network device in response to the issue.

The process 500 includes selecting (at 506), by the management system based on the received information of the plurality of network devices, a collection of network devices from among the plurality of network devices, where the selecting includes excluding a second network device from the collection of the network devices based on network connectivity information of the second network device failing to satisfy a network connectivity criterion (e.g., the second network device is not reachable over the local network or the communication link to the second network device is unreliable), and excluding a third network device from the collection of the network devices based on storage space information of the third network device failing to satisfy a storage space criterion (e.g., the third network device does not have sufficient storage space to receive a kernel dump segment).

The process 500 includes sending (at 508), from the management system to the first network device, identification information that identifies the selected collection of network devices to which the first network device is to distribute segments of the kernel dump, and an available dump storage space of each respective network device of the selected collection of network devices to receive a respective segment of the kernel dump distributed from the first network device.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

A storage medium (e.g., 300 in FIG. 3) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions executable by one or more processing circuits of a first network device to cause the first network device to:

send, to a management system, storage space information of a storage space of the first network device;

receive, at the first network device from the management system, identification information of a collection of network devices selected from among a plurality of network devices by the management system based on network connectivity information of the plurality of network devices and storage space information of the plurality of network devices; and in response to a crash of the first network device that resulted in an operating system (OS) kernel dump being created at the first network device:

partition the OS kernel dump across multiple network devices selected from the collection of network devices identified by the identification information received from the management system, the partitioning producing multiple OS kernel dump segments, and distribute, over a network, the multiple OS kernel dump segments to respective network devices of the multiple network devices.

2. The non-transitory machine-readable storage medium of claim 1, wherein the instructions are executable by the one or more processing circuits to cause the first network device to:

receive available dump storage space information of each respective network device in the collection of network devices, the available dump storage space information specifying how much storage space is available in the respective network device to receive a segment of the OS kernel dump, wherein the partitioning of the OS kernel dump into the multiple OS kernel dump segments is based on the available dump storage space information of each respective network device in the collection of network devices.

3. The non-transitory machine-readable storage medium of claim 1, wherein the instructions are executable by the one or more processing circuits to cause the first network device to:

send, to the management system, an indication of a recency of a crash of the first network device, and wherein the collection of network devices is selected from among the plurality of network devices by the management system further based on the indication of the recency of the crash of the first network device.

4. The non-transitory machine-readable storage medium of claim 1, wherein the instructions are executable by the one or more processing circuits to cause the first network device to:

send, to the management system, an indication of how many times programming of a memory of the first network device has occurred, and wherein the collection of network devices is selected from among the plurality of network devices by the management system further based on the indication of how many times programming of the memory of the first network device has occurred.

5. The non-transitory machine-readable storage medium of claim 1, wherein the management system is to exclude a given network device of the plurality of network devices from the collection of network devices based on a network connectivity of the given network device failing to satisfy a network connectivity criterion.

6. The non-transitory machine-readable storage medium of claim 1, wherein the management system is to exclude a given network device of the plurality of network devices from the collection of network devices based on an available dump storage space of the given network device being less than a storage space threshold.

7. The non-transitory machine-readable storage medium of claim 1, wherein the instructions are executable by the one or more processing circuits to cause the first network device to:

detect a failure in sending a first OS kernel dump segment of the multiple OS kernel dump segments to a second network device in the collection of network devices; and in response to detecting the failure, select another network device of the collection of network devices to which the first OS kernel dump segment is sent.

8. The non-transitory machine-readable storage medium of claim 1, wherein the OS kernel dump is to be distributed across a specified quantity of network devices, and wherein the collection of network devices includes more network devices than the specified quantity of network devices.

9. The non-transitory machine-readable storage medium of claim 1, wherein the instructions are executable by the one or more processing circuits to cause the first network device to:

send, to the management system, a notification of whether the distribution of the multiple OS kernel dump segments to the multiple network devices is successful.

10. The non-transitory machine-readable storage medium of claim 1, wherein the collection of network devices comprises network devices of the plurality of network devices that satisfy one or more criteria, and wherein a quantity of the network devices in the collection of network devices is based on how many network devices the OS kernel dump is to be partitioned across.

11. A first network device comprising:

a network interface to communicate over a network with other network devices; and a controller to:

send, to a management system, storage space information of a storage space of the first network device;

receive, at the first network device from the management system, identification information of a collection of network devices selected from among a plurality of network devices by the management system based on network connectivity information of the plurality of network devices and storage space information of the plurality of network devices; and in response to a crash of the first network device that resulted in an operating system (OS) kernel dump being created at the first network device:

partition the OS kernel dump across multiple network devices selected from the collection of network devices identified by the identification information received from the management system, the partitioning producing multiple OS kernel dump segments, and distribute, over the network, the multiple OS kernel dump segments to respective network devices of the multiple network devices.

12. The first network device of claim 11, wherein the controller is to:

receive available dump storage space information of each respective network device in the collection of network devices, the available dump storage space information specifying how much storage space is available in the respective network device to receive a segment of the OS kernel dump, wherein the partitioning of the OS kernel dump into the multiple OS kernel dump segments is based on the available dump storage space information of each respective network device in the collection of network devices.

13. The first network device of claim 11, wherein the controller is to:

detect a failure in sending a first OS kernel dump segment of the multiple OS kernel dump segments to a second network device in the collection of network devices; and in response to detecting the failure, select another network device of the collection of network devices to which the first OS kernel dump segment is sent.

14. The first network device of claim 13, wherein the OS kernel dump is to be distributed across a specified quantity of network devices, and wherein the collection of network devices includes more network devices than the specified quantity of network devices.

15. The first network device of claim 11, wherein the controller is to:

send, to the management system, a notification of whether the distribution of the multiple OS kernel dump segments to the multiple network devices is successful.

16. A method comprising:

sending, by a first network device to a management system, storage space information of a storage space of the first network device;

receiving, at the first network device from the management system, identification information of a collection of network devices selected from among a plurality of network devices by the management system based on network connectivity information of the plurality of network devices and storage space information of the plurality of network devices; and based on a crash of the first network device that resulted in an operating system (OS) kernel dump being created at the first network device:

partitioning, by the first network device, the OS kernel dump across multiple network devices selected from the collection of network devices identified by the identification information received from the management system, the partitioning producing multiple OS kernel dump segments, and distributing, by the first network device over a network, the multiple OS kernel dump segments to respective network devices of the multiple network devices.

17. The method of claim 16, further comprising:

sending, by the first network device to the management system, an indication of a recency of a crash of the first network device, wherein the collection of network devices is selected from among the plurality of network devices by the management system further based on the indication of the recency of the crash of the first network device.

18. The method of claim 16, further comprising:

sending, by the first network device to the management system, an indication of how many times programming of a memory of the first network device has occurred, wherein the collection of network devices is selected from among the plurality of network devices by the management system further based on the indication of how many times programming of the memory of the first network device has occurred.

19. The method of claim 16, further comprising:

detecting, by the first network device, a failure in sending a first OS kernel dump segment of the multiple OS kernel dump segments to a second network device in the collection of network devices; and in response to detecting the failure, selecting, by the first network device, another network device of the collection of network devices to which the first OS kernel dump segment is sent.

20. The method of claim 16, further comprising:

sending, by the first network device to the management system, a notification of whether the distribution of the multiple OS kernel dump segments to the multiple network devices is successful.

* * * * *